Figure 1:
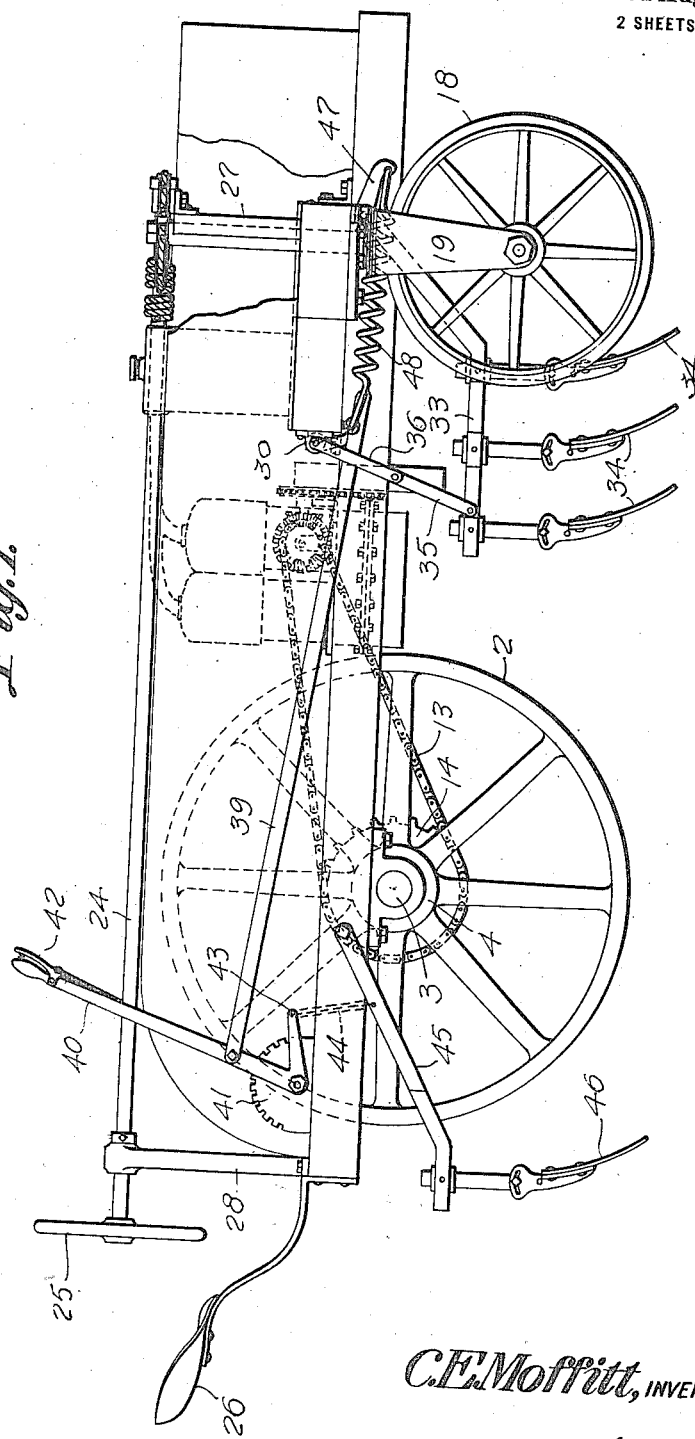

C. E. MOFFITT.
FARM TRACTOR.
APPLICATION FILED JULY 31, 1916.

1,237,939.

Patented Aug. 21, 1917.
2 SHEETS—SHEET 1.

WITNESS
F. C. Berry

C. E. Moffitt, INVENTOR

BY Munn & Co.
ATTORNEYS

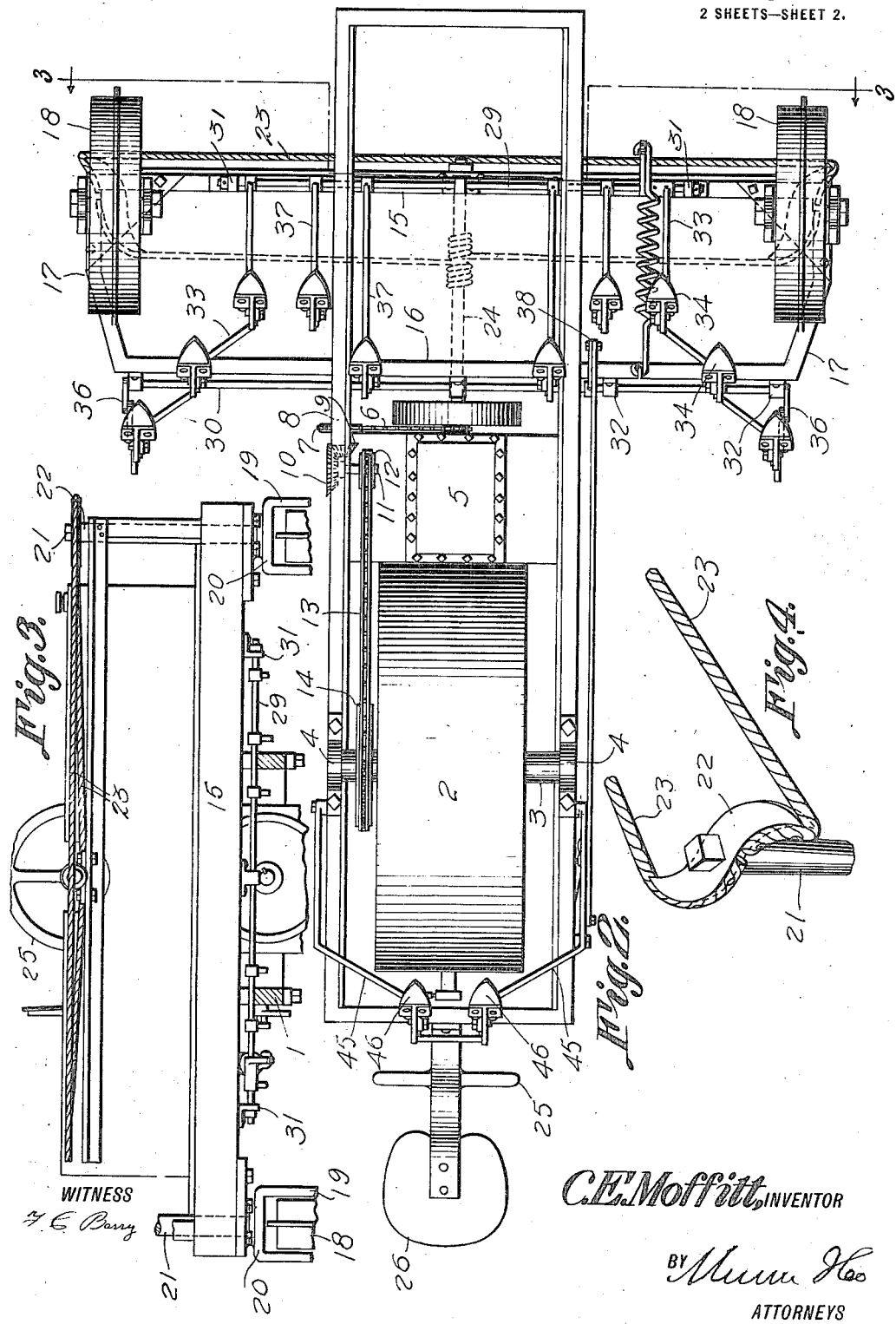

UNITED STATES PATENT OFFICE.

CHESTER E. MOFFITT, OF SIDNEY, IOWA.

FARM-TRACTOR.

1,237,939.  Specification of Letters Patent.  Patented Aug. 21, 1917.

Application filed July 31, 1916. Serial No. 112,313.

*To all whom it may concern:*

Be it known that I, CHESTER E. MOFFITT, a citizen of the United States, and a resident of Sidney, in the county of Fremont and State of Iowa, have invented an Improvement in Farm-Tractors, of which the following is a specification.

My invention is an improvement in farm tractors, and has for its object to provide mechanism of the character specified, for permitting the cultivating devices carried by the tractor to be shifted and controlled through the operation of the steering mechanism of the tractor.

In the drawings:

Figure 1 is a side view of a tractor provided with the improvement with parts in section, Fig. 2 is a bottom plan view, Fig. 3 is a section on the line 3—3 of Fig. 2 looking in the direction of the arrows adjacent to the line, Fig. 4 is a perspective view of the upper part of the steering post.

In the present embodiment of the invention the tractor comprises a main frame 1 of substantially rectangular formation having at the rear thereof a power wheel 2, which is secured to a shaft or axle 3, journaled in bearings 4 on the under-side of the side bars of the main frame.

The motor 5 is arranged in front of the power wheel, and the motor shaft is connected by means of a chain 6 with a sprocket wheel 7, on a stub shaft 8 journaled on the frame parallel with the motor shaft. The shaft 8 is provided with a bevel gear 9, which meshes with a similar gear 10 on a counter-shaft 11 journaled on the frame. This shaft 11 has a sprocket wheel 12 which is connected by means of a chain 13 with a wheel 14 on the axle, and the motor is controlled in the usual manner.

An auxiliary frame is arranged at the front of the main frame, and transversely thereof, the said auxiliary frame consisting of front and rear bars 15 and 16, and connecting end bars 17. A steering wheel 18 is arranged at each end of the auxiliary frame, and each steering wheel being mounted between the arms 19 of a yoke comprising the said arms and a body 20, and the body of each yoke is provided with a steering post 21, which is journaled in the adjacent end of the auxiliary frame.

A cross head 22 is secured to the upper end of each steering post, and the cross heads are connected by a flexible member 23, a rope, cable or chain in the present instance. Each of the cross heads is substantially S-shaped, having its opposite side edges formed on a double curve, and the two cross heads are symmetrically arranged, as shown in Fig. 2, in such manner that the forward ends of the cross heads are farther apart than the rearward ends. The rear run of the flexible member is in two portions, and the adjacent ends of the said portions are secured to the steering shaft 24 in spaced relation, and several turns are wound upon the shaft from each connection. The shaft 24 is provided at its rear end and adjacent to the seat 26 with a steering wheel 25, and the shaft is journaled in bearing brackets 27 and 28 at the front and rear of the main frame.

A shaft 29 is journaled on the under side of the front bar 15 of the auxiliary frame, and a second shaft 30 is journaled on the rear face of the rear bar 16 of the said frame. The shaft 29 is journaled in bearings 31, and the shaft 30 is journaled in bearings 32. Plow beams 33 are connected at their forward ends to the shaft 29, near the end of the auxiliary frame, and each beam 33 is provided with three plows 34. The rear end of each beam 33 is connected by means of a link 35 with a radial arm 36 on the adjacent end of the shaft 30, in such manner that when the shaft 30 is oscillated the lower ends of the beams 33 will be raised and lowered. Other beams 37 are connected with the shaft 29 on the inner sides of the beams 33, and mechanism is provided for oscillating the shaft 30.

The said mechanism comprises a radial arm 38 on the shaft 30, which is connected by means of a link 39 with a lever 40 pivoted to a toothed quadrant 41 adjacent to the seat. The lever 40 has latch mechanism 42 coöperating with the teeth of the quadrant, and the lever supports an angular arm 43 which is connected by means of a link 44 with plow beams 45 supported at the rear of the main frame, and pivoted at their front ends to the frame. These beams 45 carry plows 46, and the beams are connected at their rear ends as indicated at 49, in such manner that the lever 40 may simultaneously raise and lower the beams.

A coil spring 48 is arranged between the shaft 29 and the bar 16, to assist in raising the plows from the ground. The spring is connected at its forward end with a radial arm 47 on the shaft, and acts to oscillate the shaft 29 in a direction to aid in lifting the plows.

In operation the driver from the seat 26 may control the plows, moving them into and out of operative position, and he may also steer the vehicle, by means of the steering wheel 25. When this wheel is oscillated in one direction, the portion of the rear run of the flexible member on one side of the shaft will be wound on the shaft, while that on the other side will be unwound. This will swing the rear end of one cross head toward the steering shaft and the rear end of the other away from the steering shaft, thus swinging the wheels 18, to change the direction of motion of the frame, and the cultivating mechanism will be carried with the front end of the frame.

It will be understood that any type of motor or transmission mechanism may be used, and the cross heads are so constructed that the flexible member will always be snug and tight, and the steering wheels at the proper angle to each other, regardless of what the turning radius may be. It will be understood that any form of cultivating mechanism may be used instead of plows.

It will be noted that the steering device permits each steering wheel to be turned so that there will be no crowding of wheels as the machine is turned, no matter what the turning radius may be. The line of travel of any wheel is always at right angles to the radius, and it will be noted that the turn can be made very short. The steering heads will be symmetrically placed with respect to the perpendicular bisector of the line adjoining their turning centers only when the machine is operated in a straight line ahead. It will be evident that the flexible connection between the cross heads may connect with the steering shaft at either run of the flexible member. The curved radial arms are so designed and placed, that the flexible member will always be taut and the prolongation of the axes of the steering wheels will always pass through the point about which the machine is turning.

I claim:

A device of the character specified, comprising a main frame, a power wheel journaled at the rear of the main frame, an auxiliary frame arranged transversely of the main frame at the front thereof, a steering wheel at each end of the auxiliary frame, a mounting for each steering wheel journaled in the auxiliary frame on a vertical axis, and means for simultaneously swinging the steering wheels, said means comprising a cross head connected with each mounting at the upper end thereof, a flexible connection between adjacent ends of the cross heads, and a steering shaft, the rearmost connection between the cross heads winding upon the steering shaft, said cross heads being substantially S shaped, and being symmetrically arranged.

C. E. MOFFITT.